United States Patent
Malic et al.

(10) Patent No.: US 9,915,446 B2
(45) Date of Patent: Mar. 13, 2018

(54) METHOD FOR ELECTROCALORIC ENERGY CONVERSION

(71) Applicants: Jozef Stefan Institute, Ljubljana (SI); University of Ljubljana, Ljubljana (SI)

(72) Inventors: Barbara Malic, Ljubljana (SI); Hana Ursic, Ljubljana (SI); Marija Kosec, Ljubljana (SI); Silvo Drnovsek, Ljubljana (SI); Jena Cilensek, Ljubljana (SI); Zdravko Kutnjak, Ljubljana-Dobrunje (SI); Brigita Rozic, Zrece (SI); Uros Flisar, Radomlje (SI); Andrej Kitanovski, Kranj (SI); Marko Ozbolt, Kocevje (SI); Uros Plaznik, Velika Loka (SI); Alojz Poredos, Dol pri Ljubljani (SI); Urban Tomc, Ljubljana-Dobrunje (SI); Jaka Tusek, Ljubljana (SI)

(73) Assignee: Gorenje d.d., Velenje (SI)

(*) Notice: Subject to any disclaimer, the term of this patent is extended or adjusted under 35 U.S.C. 154(b) by 95 days.

(21) Appl. No.: 14/908,614

(22) PCT Filed: Jul. 29, 2014

(86) PCT No.: PCT/EP2014/066306
§ 371 (c)(1),
(2) Date: Jan. 29, 2016

(87) PCT Pub. No.: WO2015/014853
PCT Pub. Date: Feb. 5, 2015

(65) Prior Publication Data
US 2016/0187034 A1    Jun. 30, 2016

(30) Foreign Application Priority Data

Aug. 1, 2013 (EP) .................................. 13179000

(51) Int. Cl.
*F25B 21/00* (2006.01)

(52) U.S. Cl.
CPC ........ *F25B 21/00* (2013.01); *F25B 2321/001* (2013.01); *Y02B 30/66* (2013.01)

(58) Field of Classification Search
CPC ..... Y02B 30/66; F25B 21/00; F25B 2321/001
See application file for complete search history.

(56) References Cited

U.S. PATENT DOCUMENTS

| 4,757,688 A | 7/1988 | Basiulis et al. |
| 6,877,325 B1 | 4/2005 | Lawless |

(Continued)

FOREIGN PATENT DOCUMENTS

| WO | 2006/056809 A1 | 6/2006 |
| WO | 2011/113791 A1 | 9/2011 |

OTHER PUBLICATIONS

Perantie et al., "Electric-held-induced dielectric and temperature changes in a (011)-oriented Pb(Mg113Nb213)O3-PbTiO3 single crystal", Physical Review B, vol. 82, 2010, pp. 134119-1-134119-8.

(Continued)

*Primary Examiner* — Len Tran
*Assistant Examiner* — Ana Vazquez
(74) *Attorney, Agent, or Firm* — Renner, Otto, Boisselle & Sklar, LLP (57) ABSTRACT

The present invention lies in the field of electrocaloric energy conversion. More specifically, the present invention relates to improvements in systems and methods which employ electrocaloric materials as a source of temperature variation in electrocaloric refrigeration processes. Even more specifically, the present invention relates to the application of electrocaloric materials in combination with a working fluid communicating with a heat source and a heat sink in counter flow.

12 Claims, 7 Drawing Sheets

(56) References Cited

U.S. PATENT DOCUMENTS

| | | |
|---|---|---|
| 2009/0040007 A1 | 2/2009 | Stenmark |
| 2010/0175392 A1 | 7/2010 | Malloy et al. |
| 2011/0113791 A1 | 5/2011 | Kruglick |
| 2011/0146308 A1 | 6/2011 | Casasanta |
| 2012/0055174 A1 | 3/2012 | Kruglick |

OTHER PUBLICATIONS

Sebald et al., "Electrocaloric and pyroelectric properties of 0.75Pb(Mg1/3Nb2/3)O3-0.25PbTiO3 single crystals", Journal of Applied Physics, vol. 100, 2006, pp. 124112-1 124114-6.

Rozic et al., "Influence of the critical point on the electrocaloric response of relaxor ferroelectrics", Journal of Applied Physics, vol. 110, 2011, pp. 064118-1-064118-5.

Neese et al., "Large Electrocaloric Effect in Ferroelectric Polymers Near Room Temperature", Science, vol. 321, Aug. 8, 2008, pp. 821-823.

Lu et al., "Organic and inorganic relaxor ferroelectrics with giant electrocaloric effect", Applied Physics Letters, vol. 97, 2010, pp. 162904-1-162904-3.

Chiou et al., "A novel thermal switch and variable capacitance implement by CMOS MEMS process approaching in micro electrostatic converter", Solid-State Electronics, vol. 77, 2012, pp. 56-63.

Cho et al., "Fabrication and characterization of a thermal switch", Sensors and Actuators A, vol. 133, 2007, pp. 55-63.

International Search Report and Written Opinion for corresponding International Application No. PCT/EP2014/066306 dated Sep. 29, 2014.

Extended European Search Report for corresponding European Patent Application No. 13179000.8 dated Nov. 11, 2013.

METHOD FOR ELECTROCALORIC ENERGY CONVERSION

This application is a national phase of International Application No. PCT/EP2014/066306 filed Jul. 29, 2014 and published in the English language, which claims priority to Application No. EP 13179000.8 filed Aug. 1, 2013.

FIELD OF THE INVENTION

The present invention lies in the field of electrocaloric energy conversion. More specifically, the present invention relates to improvements in systems and methods which employ electrocaloric materials as a source of temperature variation in electrocaloric refrigeration, heat pump or power generation processes. Even more specifically, the present invention relates to the application of electrocaloric materials in combination with a working fluid and/or thermal diodes or thermal switches communicating with a heat source and a heat sink in counter flow.

BACKGROUND

The vast majority of current refrigeration systems are based on vapor compression technology, thus applying compression and expansion of a fluid refrigerant. Since many refrigerants have large ozone depletion potential, and are often seen as a possible factor in global-warming, a significant effort has been dedicated lately to the development of alternative refrigeration technologies.

Various electrocaloric materials (ECMs) are known. Such ECMs react to changes in the strength of an electric field, to which they are exposed, by changing their temperature. ECMs increase in temperature upon increase of the electric field and they decrease in temperature upon reduction (or removal) of the applied field. With the recent discovery and development of improved electrocaloric materials (the improvement lying in an increased temperature difference effected by the change in electric field strength) this technology has attracted further attention in the refrigeration field. The art has recognized that the electrocaloric effect can be applied not only for refrigeration, but also for the other types of processes, such as air conditioning, heat pump technology, and power generation.

The use of ECMs in refrigeration systems is known. Known concepts use cascading thermal bridges including electrocaloric materials as the refrigerant and thermal diodes (or thermal switches) as the heat transfer mechanism. For example U.S. Pat. No. 4,757,688 and US 2011/0113791 A1 use a "heat pipe" as a thermal switch between heat source and heat sink and/or between different stages of the ECM. US 2010/0175392 A1, on the other hand, uses liquid crystal thermal switches. US 2011/0146308 A1 describes the use of ECM in a form of a membrane which is alternatively disposed between heat source and heat sink, thereby selectively transferring the heat. In U.S. Pat. No. 6,877,325 B1 a single stage and a cascade electrocaloric device using heat exchangers between successive stages is disclosed. U.S. Pat. No. 6,877,325 B1 also provides a concept in which a working fluid passes through the electrocaloric material. However, this system cannot provide internal heat regeneration (as defined below), since it works as a single stage or as a cascade device, and does not apply a working fluid in counter flow operation.

US 2012/0055174 A1 discloses systems for transferring heat from a heat source to a heat destination including one or more electrocaloric heat pumps based on an electrocaloric material thermally and mechanically coupled to both ends of a heat pipe.

WO 2006/056809 A1 discloses a cooling device comprising several electrocaloric working elements separated by heat switches in a cascaded or paralleled arrangement to improve the cooling effect.

WO 2011/0113791 A1 discloses systems and processes for thermal management using the electrocaloric effect. An electrocaloric element is interposed between an electronic component (heat source) and a heat pipe, wherein the heat pipe is also thermally coupled to a heat sink.

All electrocaloric refrigeration systems known to date suffer from relatively large heat transfer losses and they can only produce a relatively limited temperature difference between heat source and sink. Such systems are not deemed competitive with vapor-compression technology. The large heat transfer losses occur, because in the known systems (such as the ones described in U.S. Pat. No. 4,757,688 and US 2011/0113791 A1) a cascade connection of ECM is applied in order to increase the temperature difference. Since the adiabatic temperature difference of a single stage of ECM is rather small, a useful device (producing a sufficiently high temperature difference of, e.g., 35 K) will require ten or more cascades. This leads to a large loss of energy. On the other hand a small number of cascades will not produce a sufficiently large temperature difference.

Against this background, the present inventors have developed a system and methods for electrocaloric energy conversion, which systems and methods overcome the above shortcomings. The invention is based on the use of ECM and selective heat transfer mechanisms, which enable heat to be selectively transported from an ECM towards a first stream of working fluid (flowing towards a heat sink) and from a second stream of working fluid towards the ECM (said second stream flowing towards a heat source). An important aspect of the first and second streams of working fluid is that they are in counter flow. Preferably, said first and second streams of working fluid are thermally coupled and in counter flow. By using ECM as an internal regenerator between said first and second streams of working fluid, said streams being in counter flow, rather large temperature differences can be established between heat source and sink. The present invention is based on a concept of combining internal heat regeneration (through working fluid flowing in counter flow) with the generation of temperature differences using electrocaloric materials. Such internal regeneration of heat energy (IRE) has not been applied in electrocaloric energy conversion systems so far.

SUMMARY OF THE INVENTION

The present invention relates to a system for electrocaloric energy conversion, said system comprising
a heat sink;
a heat source;
a first convective stream of working fluid flowing towards said heat sink;
a second convective stream of said fluid flowing towards said heat source; and
an electrocaloric material (ECM); wherein
means are provided for alternately exposing said ECM to increasing and decreasing electrical fields, wherein, when said ECM is exposed to an increasing electrical field, the temperature of said ECM is increased, and wherein, when said ECM is exposed to a decreasing electrical field, the temperature of said ECM is reduced; said system further comprising means for allowing transport of heat (preferably selective transport of heat) from said ECM to said first convective stream, when the ECM is at a higher temperature than the temperature of said first convective stream (24), thereby increasing the temperature of said first convective stream; and means for allowing transport of heat (preferably selective transport of heat) from said second convective stream to said ECM, when said ECM is at a lower temperature than the temperature of said second convective stream (25), thereby decreasing the temperature of said second convective stream;

such that, preferably, said first and second convective streams of said working fluid, upon operation, result in a net flow of heat energy from said heat source to said heat sink.

Preferably, the first convective stream (24) of working fluid flows from heat source to heat sink (or all the way from heat source to heat sink). Likewise, preferably, the second convective stream (25) of working fluid flows from heat sink to heat source (or all the way from heat sink to heat source).

The first and second convective streams of working fluid are preferably single-phase streams of working fluid, e.g., liquid streams of working fluid or gaseous streams of working fluid. In other words, the first and second streams of working fluid preferably do not undergo evaporation or condensation.

"Selective" transport of heat from ECM to first convective stream, within the context of the present invention, means that the transport of heat from ECM to first convective stream is enhanced relative to the transport of heat from second convective stream to the ECM at the given time. Selective transport of heat may be achieved by arranging thermal diodes and/or thermal switches between ECM and first convective stream. In this embodiment, the selective transport of heat is unidirectional transport of heat. In other embodiments "selective" transport of heat is effected by a reciprocating flow of the working fluid, in which case only one of first and second convective streams is present at any given time, such that heat transport can only occur either between ECM and first convective stream or between second convective stream and ECM.

The second stream of working fluid is preferably thermally coupled to the ECM and the ECM is thermally coupled to the first stream of working fluid. In this manner a thermal coupling (indirect thermal coupling through the ECM) is established between the first and second streams of working fluid.

In one embodiment, said first and second convective streams of working fluid are in separate (or distinct) conduits, and said means for allowing transport of heat from the ECM to the first convective stream, and said means for allowing transport of heat from the second convective stream to the ECM both comprise a thermal diode or a thermal switch, or both.

The conduits are preferably in the form of at least one slot, or at least one bore, respectively, within said ECM, through which at least one slot or bore the working fluid can flow. The conduits, however, can also be in form of the pores in a porous ECM.

Preferably said first and said second convective streams are each thermally coupled to said ECM via said thermal diode or a thermal switch.

In another embodiment, said first and second convective streams of working fluid occur alternately within the same conduit (e.g., during distinct periods of time). In this embodiment said means for allowing transport of heat from said ECM to said first convective stream, and from said second convective stream to said ECM comprise means for controlling said alternating convective streams in said conduit in such a manner that said first convective stream occurs at time periods when said ECM is at a higher temperature than said first convective stream, and said second convective stream occurs at time periods, when said ECM is at a lower temperature than said second convective stream.

In an alternative embodiment, the alternating flow of first and second stream of working fluid is controlled on the basis the strength of the electrical field in which the ECM is arranged.

First and second stream of working fluid preferably occur in an alternating fashion in opposite directions. In one embodiment, said alternating first and second convective streams are effected by a reciprocating flow of said working fluid through said conduit.

According to a preferred embodiment, said conduit is in form of at least one slot within said ECM, through which slot the working fluid can flow. The conduit, however, can also be in form of the pores of a porous ECM.

The first and second convective streams are preferably each thermally coupled with said ECM via a heat conductive material, or—even more preferred—directly via a common surface.

According to preferred embodiments, the ECM is selected from the list consisting of: electrocaloric single crystals, electrocaloric ceramics and electrocaloric polymers. For example lead-based materials, such as $Pb(Mg,Nb)O_3$-based or $Pb(Zr,Ti)O_3$-based materials are typical electrocaloric materials, which can be prepared as single crystals or ceramics (Peräntie et al. Physical Review B 82, 2010; Sebald et al., Journal of Applied Physics 100, 2006; Rožič et al., Journal of Applied Physics 110, 2011). The typical representative of electrocaloric polymers is a poly(vinylidene fluoride-trifluoroethylene) polymer (Neese et al. Science 321, 2008; Lu et al., Applied Physics Letters 97, 2010).

Preferably, said heat source is at a temperature level lower than the temperature level of said heat sink.

According to a preferred embodiment, said means for allowing transport of heat from said second convective stream to said ECM, and from said ECM to said first convective stream allows transport of heat at multiple stages along said ECM. In this manner, a temperature gradient in (or along) said first and second convective flow is advantageously established. It is then advantageous to apply different ECMs having different Curie temperatures, such that the ECMs may operate at temperature levels at which levels their electrocaloric effect is relatively large.

According to the invention, the working fluid is preferably selected from the group consisting of: liquid working fluid, water, aqueous solutions, liquid metals, alcohols, saline, refrigerants, and oil. The working fluid may be an electrically conducting fluid, or may be a dielectric fluid.

According to a preferred embodiment, the system comprises multiple electrocaloric devices with slots therebetween. The multiple electrocaloric devices are preferably in the form of multiple flat plates stacked upon each other, with slots therebetween.

According to a preferred embodiment, the first and second convective streams are connected front to end, such as to allow circular flow of the working fluid between heat source and heat sink.

Preferably, the system for electrocaloric energy conversion is a system for regenerative electrocaloric energy conversion, in that heat energy is taken up by the ECM from the second convective stream of working fluid, then stored intermittently (or temporarily) by said ECM, and then passed from said ECM to said first convective stream of working fluid. For efficient regenerative electrocaloric energy conversion the ECM of the invention is preferably an ECM having a large volumetric heat capacity $c_P$ [J cm$^{-3}$ K$^{-1}$]. Preferably, the volumetric heat capacity of the ECM is equal to or above 0.5, 0.6, 0.7, 0.8, 0.9, 1.0, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, or 4 J cm$^{-3}$ K$^{-1}$.

Preferably, the means for alternately exposing said ECM to increasing and decreasing electrical fields are adapted to alternately expose said ECM to increasing and decreasing electrical fields at a frequency of from 1 to 100 Hz, or from 5 to 50 Hz, or from 10 to 30 Hz. Hence, the frequencies at which the electrical fields are oscillating are significantly greater than the frequencies at which e.g. heat pipes can be operated. (In the context of the invention, a frequency of 1 Hz shall mean that it takes 1 second to complete a full cycle of increasing and decreasing the respective electrical field.)

Preferably, the thermal switch and/or thermal diode of the invention are controlled (or adapted to be controlled) by a voltage which is synchronized (e.g., has the same frequency) as the alternately increasing and decreasing electrical field, to which the ECM is exposed.

The present invention also relates to other method of electrocaloric energy conversion, said method comprising the steps of:
  providing a heat sink;
  providing a heat source;
  providing a first convective stream of working fluid flowing towards said heat sink;
  providing a second convective stream of working fluid flowing towards said heat source;
  providing an ECM; and
  alternately exposing said ECM to an increasing and a decreasing electrical field, wherein, when said ECM is exposed to said increasing electrical field, the temperature of said ECM is increased, and, when said ECM is exposed to said decreasing electrical field, the temperature of said ECM is decreased; and
  allowing for transport of heat (preferably selective transport of heat) from said ECM to said first convective stream, when said ECM is at a higher temperature level than is said first convective stream, thereby increasing the temperature of said first convective stream (24) of working fluid; and
  allowing for transport of heat (preferably selective transport of heat) from said second convective stream of working fluid to the ECM, when said ECM is at a lower temperature level than is said second convective stream of working fluid, thereby decreasing the temperature of said second convective stream of working fluid.
  Preferably, a net flow of heat from said heat source to said heat sink by said first and second convective streams of working fluid is thereby produced.

In methods of the invention, the first convective stream (24) of working fluid preferably flows from heat source to heat sink (i.e., all the way from heat source to heat sink). Likewise, preferably, the second convective stream (25) of working fluid flows from heat sink to heat source (i.e., all the way from heat sink to heat source).

The first and second convective streams of working fluid are preferably single-phase streams of working fluid, e.g., liquid streams of working fluid or gaseous streams of working fluid. In other words, the first and second streams of working fluid preferably do not undergo evaporation or condensation.

In one embodiment of the inventive method, said first and second convective streams of working fluid are provided in separate conduits, and the transport of heat (preferably selective transport of heat) from said ECM to said first convective stream, and said transport of heat (preferably selective transport of heat) from said second stream of working fluid to said ECM are respectively effected through a thermal diode or through a thermal switch.

In another embodiment of the inventive method, the first and the second convective streams of working fluid are provided alternately in the same conduit, and said transport of heat from said ECM to said first convective stream and from said second convective stream to said ECM is effected by controlling the alternating convective flow in such a manner that said first convective flow occurs at time periods when said ECM is at a higher temperature than is said first convective stream, and said second convective flow occurs at time periods when said ECM is at a lower temperature than is said second convective stream.

Hence, the first convective stream preferably occurs when the working fluid has a relatively high temperature, whereas the second convective stream preferably occurs when the working fluid has the relatively low temperature.

In a preferred embodiment of the invention, the alternating first and second convective flows are effected by a reciprocating flow of said working fluid through said conduit.

Preferably, the heat source is at a temperature level below the temperature level of said heat sink.

In other preferred methods of the invention, said transport of heat from said second convective stream to said ECM, and from said ECM towards said first convective stream occurs at multiple stages along said ECM. Preferably, a temperature gradient in said first and in said second convective flow is then established.

According to preferred methods of the invention, the working fluid is selected from the group consisting of liquid working fluid, water, aqueous solutions, liquid metal, alcohols, saline, oil or refrigerants.

DETAILED DESCRIPTION OF THE INVENTION

An "electrocaloric material", or ECM, within the context of the present invention, shall be understood as being any material which increases in temperature upon exposure to an increasing electrical field, and which material decreases in temperature upon exposure to a decreasing electrical field.

An "electrocaloric device", according to the invention, shall be understood as being a device comprising a capacitor including spaced apart electrodes, wherein an ECM is disposed between the electrodes of the capacitor, acting as the dielectric. The ECM in the electrocaloric device increases in temperature upon application of a voltage to the capacitor and the ECM decreases in temperature upon removal of said applied voltage.

A "thermal diode", according to the invention, shall be understood as being a device or a material the heat transport capacity of which is dependent on the direction of heat transport. Preferred thermal diodes of the invention have a large heat transport capacity in one direction, but have a small heat transport capacity in the opposite direction. They may thus be regarded as being unidirectional heat conductive elements. Thermal diodes based on solid state physics, or on microfluidics are known and readily available to the person skilled in the art. Thermal diodes are described, e.g., in U.S. Pat. No. 4,757,688.

Thermal diodes may be implemented on the basis of one or several of the following principles:

Thermoelectrics
Thermionics
Spintronics
Spincaloritronics
Thermal rectification
Electro-hydrodynamics
Magneto-hydrodynamic
Acoustic-hydrodynamics
Microfluidics
Electrowetting Such thermal diodes are well known.

A "thermal switch", according to the invention, shall be understood as being a device or material, which has a controllable heat transport capacity. Compared to a thermal diode mechanism, the "thermal switch" can allow or stop the heat to flow (similar as the valve does in water system), but does not provide a control of the heat flux direction and in most cases does not provide control of the heat flux intensity. An example for the "thermal switch", which of course can be considered as the subdomain of "thermal diode", is the thermal rectifier, e.g. based on application of controllable thermal conduction of the ECM material. Thermal switches useful in the context of the present invention, e.g., are the ones described by Chiou et al. (2012, Solid-State Electronics, 77: 56-63), Cho et al. (2007, Sensors and Actuators, A133: 55-63), and in US 2009/0040007.

A "working fluid", according to the invention, shall be understood as being any fluid having a sufficiently large specific heat capacity (J kg$^{-1}$ K$^{-1}$), useful for convective heat transport. A working fluid may be a gas or a liquid, a nano fluid or a suspension. Preferred working fluids of the invention have a specific heat capacity c of equal to or greater than 4 kJ kg$^{-1}$ K$^{-1}$. Alternatively, the working fluid may have a specific heat capacity of equal to or greater than 0.1, or 1, or 2 kJ kg$^{-1}$ K$^{-1}$). Liquid working fluids are preferred for their greater heat capacity. Suitable working liquids are depending on the solution that regards how the ECM material is being prepared. If it is insulated, then the working fluids can be electrically conducting, e.g. water, liquid metals, water solution with anti-freezing depressants, alcohols, refrigerants etc. If the ECM material is not insulated, then the working fluid must be dielectric, e.g. silicone oils, mineral oils, deionized water, liquid nitrogen, liquid oxygen, etc.

The electrocaloric material is preferably in form of a film or layer or plate, sandwiched between two thermal diode mechanisms. In this case, internal heat regeneration and simultaneous electrocaloric energy conversion is achieved by a first convective stream of working fluid flowing towards a heat sink and a second stream of working fluid flowing towards a heat source (said first and second streams thus flowing in counter flow). The ECM is thermally coupled to said first and to said second streams of working fluid via the thermal diodes. In this embodiment, the thermal diodes are applied to allow for selective (or directed) heat transfer from the second stream of working fluid towards the ECM, and selective heat transfer from the ECM towards the first stream of working fluid. Specifically, thermal diodes are applied for allowing heat transfer from the second stream of working fluid to the ECM (but not, or to a lesser extent, from the first stream of working fluid to the ECM), when the electrocaloric material is not exposed to an electrical field (i.e., at low temperature level of the ECM). On the other hand, the thermal diodes are used to allow for heat transfer from the ECM towards the first stream of working fluid (but not, or to a lesser extent, from the ECM to towards the second stream of working fluid), when the electrical field is applied to the ECM (i.e., at high temperature level of the ECM).

In some embodiments, the electrocaloric material forms a structure with internal slots, through which the working fluid can flow. Internal heat regeneration and simultaneous exploitation of the electrocaloric effect is then achieved by application of a working fluid flowing from a heat sink, through the electrocaloric material's internal structure, to the heat source, when the electrocaloric material is exposed to an electrical field; whereas the working fluid flows from the heat source to the heat sink through the electrocaloric material's internal structure, when the electrocaloric material is not exposed to an electrical field. The working fluid thus flows through the ECM in an oscillating manner. One may hence regard the flow regime according to this second embodiment of the invention as applying a "time-separated counter flow", in which the first stream of working fluid towards the heat sink and the second stream of working fluid towards the heat source are not spatially separated, but separated in the time domain. The first convective stream of working fluid occurs during a first group of time periods, whereas the second stream of working fluid occurs during a second (complementary) group of time periods, in the opposite direction.

Internal heat generation and simultaneous transfer of heat can thus be provided by two different heat transfer mechanisms:

1. Heat transport effected by an oscillatory convective flow of working fluid combined with oscillatory changes of the temperature of an ECM.
2. Heat transport effected from and to two spatially separated streams of working fluid, each stream being thermally coupled to the ECM through a thermal diode or a thermal switch.

Figure 1:
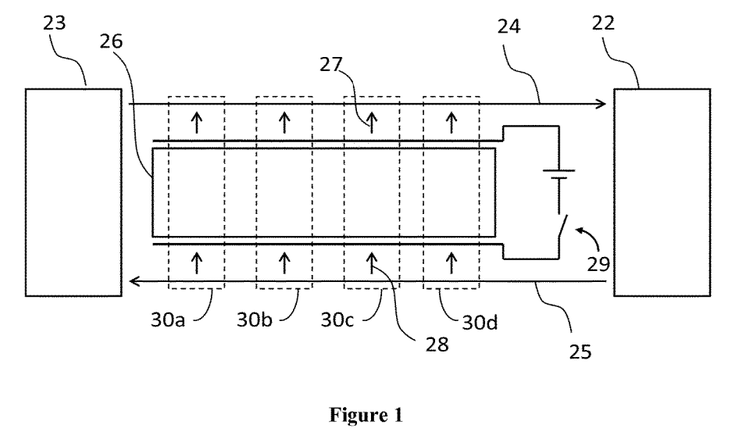
FIG. 1 provides a schematic drawing of a system of the invention.

FIG. 1 shows a schematic drawing of a system according to the invention. The system comprises a heat source 22 and a heat sink 23. The system further comprises a first convective stream of working fluid 24 and a second convective stream of working fluid 25. The first convective stream of working fluid 24 flows towards the heat source 22, whereas the second convective stream of working fluid 25 flows towards the heat sink 23. First and second convective streams of working fluid are thus in counter flow orientation to each other. In between the first convective flow 24 and second convective flow 25, there is disposed electrocaloric material 26 (ECM). ECM 26 is provided as part of an electrocaloric device, which includes ECM 26 disposed within the two opposing electrodes of a capacitor. Due to the electrocaloric effect, the temperature of ECM 26 is increased when a voltage is applied to the capacitor. Likewise, the temperature of ECM 26 is decreased, when the voltage is removed. Means 29 are provided for alternatively exposing ECM 26 to an electric field and not exposing ECM 26 to an electric field. Heat 27 is transferred from ECM 26 to first convective stream of working fluid 24 when ECM 26 is exposed to the electric field. At this stage, the temperature of ECM is relatively high. The heat transfer is "selective", in the sense that heat 27, at this stage, is transferred selectively in the direction from ECM 26 towards first convective stream 24, and not (or to a lesser extent) in the direction from ECM 26 towards second convective stream 25. When ECM 26 is not exposed to an electric field, and hence is at a lower temperature level, heat 28 is selectively transferred from the second convective stream of working fluid 25 towards ECM 26. This transfer of heat 28 is "selective" in the sense that heat transfer from first convective stream 24 towards the ECM 26 does not occur (or to a lesser extent). In this fashion, the cyclically heated and cooled ECM 26, in combination with a "selective" heat transfer mechanism, pumps heat from second convective stream 25 to first convective stream 24 of working fluid. The heat transfer so achieved, in combination with a convective flow of streams 24 and 25, leads to the establishment of a temperature gradient along convective streams 24 and 25. The thermal coupling of first and second streams 24, 25 of the working fluid through ECM 26 in counter flow allows a large temperature difference to be established between heat source 23 and sink 22.

As indicated in FIG. 1 by dashed lines at 30a, 30b, 30c, 30d, transfer of heat may take place at multiple stages along ECM 26. This adds to the temperature gradient along first 24 and second convective flow 25 of working fluid, and along ECM 26. The number of stages shown in FIG. 1 (in this case, four) is for illustration purposes only. As will be understood by the skilled person, any number of (theoretical) stages can be assumed.

It will be understood that first 24 and second convective flow 25 of the working fluid may be separated from each other spatially, or they can be separated in the time domain. Spatial separation may be achieved by transporting the first 24 and second convective stream 25 of working fluid through separate conduits, such as through separate slots within or adjacent to ECM 26. Separation in the time domain, on the other hand, may be achieved by oscillatory (or reciprocating) movement of the working fluid through the same conduit or through slots within or adjacent to ECM 26.

In the embodiments where the first 24 and second stream 25 of working fluid flow is in separate conduits, selective transport of heat from second stream 25 towards ECM 26 and from ECM 26 towards first stream 24 is achieved by application of thermal diodes or thermal switches. The thermal diodes or thermal switches effectively transfer heat from second stream 25 to ECM 26 and from ECM 26 to first stream 24, but they effectively avoid (or reduce) heat transfer from the first stream 24 towards ECM 26, when ECM 26 is at the low temperature level; and from ECM 26 towards second stream 25, when ECM 26 is at the high temperature level.

In embodiments where first 24 and second stream 25 of working fluid flow in the same conduit, selective transfer of heat from second stream 25 towards ECM 26 and from ECM 26 towards first stream 24 is achieved by timing the oscillatory flow of the working fluid appropriately. For example, the flow of working fluid in the conduit may be in the direction of the heat sink, when ECM 26 is exposed to the electric field (and thus at a high temperature level). On the other hand, the flow of the working fluid in the conduit may be in the direction of the heat source, when ECM 26 is not exposed to the electric field (and thus at a low temperature level). In this manner, selective transfer of heat to first 24 or second stream 25 of working fluid can be achieved without application of thermal diodes or switches.

Further aspects of the invention are now described with reference to the remaining figures.

Figure 2:
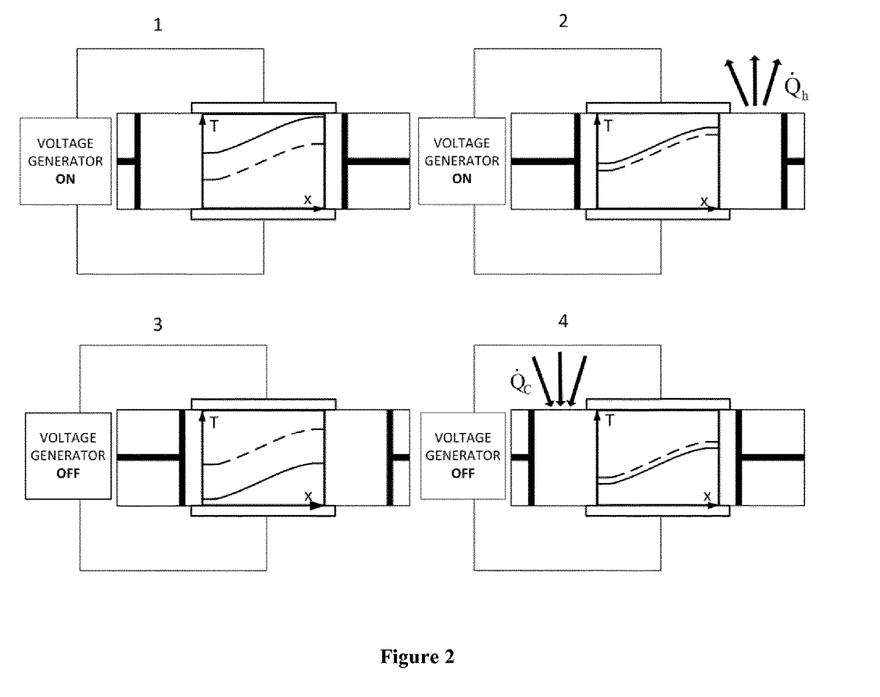
FIG. 2 shows various stages of an IRE Brayton thermodynamic cycle according to the invention.

FIG. 2 shows four operation steps of the IRE Brayton refrigeration thermodynamic cycle including convective heat transfer without the application of thermal diodes. In the FIG. 2, only selected thermodynamic paths of particles are shown. In a first step, adiabatic polarization occurs, at which stage the ECM is subjected to an increasing electric field. This causes the heating of the ECM due to the electrocaloric effect. In a second step, fluid flows through the heated ECM structure towards the heat sink (i.e., a hot external heat exchanger, HHEx), while the ECM is exposed to a high electric field. During this process the ECM cools down and the temperature of the working fluid increases. This hot fluid in the HHEx transfers the heat to the surrounding. In a third step, adiabatic depolarization occurs, during which the ECM is subjected to a decreasing electric field. This causes a decrease of the temperature of the ECM due to the electrocaloric effect. In a fourth step, fluid flow through a relatively cool ECM structure (in a low electric field) towards a heat source (e.g., a cold heat exchanger CHEx) occurs. This cooler fluid in the CHEx absorbs the heat from the environment. In this system, the oscillating fluid flow can be regarded as being in "counter flow", in that the fluid flow in the second step (hot) and in the fourth step (cold) are in opposite directions. When the above four steps are repeated in multiple cycles, and if only part of the working fluid is transported from heat source to sink, or vice versa, in each cycle, a temperature profile will establish along the electrocaloric material (i.e., between hot and cold external heat exchanger). The established temperature difference between the heat exchangers, as well as the cooling capacity and the effectiveness of the process can be modified, dependent on the operating conditions chosen (mass flow rate, operating frequency, etc.). Also the nature of the ECM, its geometry, the electric field applied, the working fluid, and other factors will have an effect.

As will be appreciated by the skilled person, different thermodynamic cycles can be implemented. From a thermodynamic point of view the inventive processes lead to unique electrocaloric thermodynamic cycles. These thermodynamic cycles do not perform work in the same manner as this is done in the conventional electrocaloric thermodynamic cycle. In the present case, a thermodynamic cycle is performed in multiple units (or stages) of the ECM, whereas the units of the ECM do cross their thermodynamic paths at different time sequences, but not at the same time, as is the case in cascade systems. Each unit of the ECM does not directly pump heat to the next-neighbor unit, but all units accept or reject heat from or to the working fluid (or thermal diode) at the same time and are coupled indirectly through the fluid (or thermal diode). The units and their local thermodynamic cycles interact with the neighboring ones by the heat transport of the fluid (as well as the thermal diode, if applied), thus performing the internal regenerative process.

Figure 3:
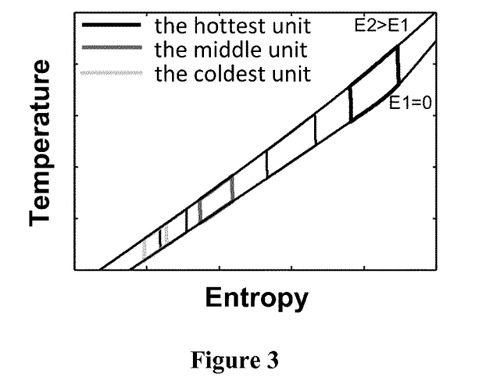
FIG. 3 shows three IRE Brayton thermodynamic cycles in a temperature-entropy diagram.
Figure 4:
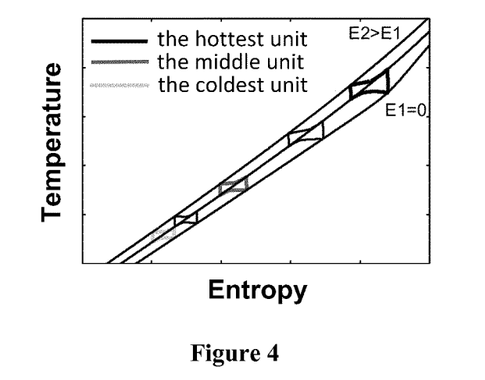
FIG. 4 shows three IRE Carnot cycles according to the invention in a temperature-entropy diagram.
Figure 5:
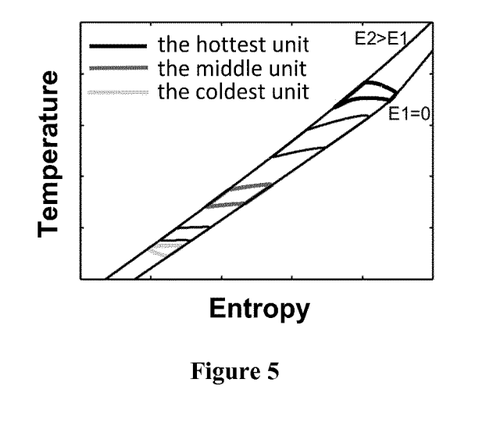
FIG. 5 shows three IRE Ericsson cycles according to the invention in a temperature-entropy diagram.

FIGS. 3, 4, and 5 show various examples of thermodynamic cycles according to the invention. This can be achieved by combinations of four basic steps. For example, IRE Ericsson thermodynamic cycle is, unlike IRE Brayton cycle, based on isothermal (de)polarization of the electrocaloric material, which can be performed by simultaneous (de)polarization of the ECM and fluid flow. During this process the electrocaloric material heats up due to the polarization, while at the same time heat is removed from the ECM by the working fluid and thus keeping the electrocaloric material at the constant temperature. In addition, different hybrid cycles are also possible. These would be achieved if the first part of (de)polarization process is adiabatic and the second part isothermal. This leads to a kind of IRE Brayton-Ericsson thermodynamic cycle. In the case of the IRE Carnot-like thermodynamic cycle, each unit of the electrocaloric material performs its own Carnot cycle, but the entire IRE cycle is similar to hybrid IRE Brayton-Ericsson thermodynamic cycle. It is based on an adiabatic and isothermal (de)polarization process. Unlike the case of other above presented IRE thermodynamic cycles IRE Carnot-like cycle is not based on the process of fluid flow in homogenous electric field, but only applies the increase and decrease of electric field.

As shown above, the combination of the internal regeneration by working fluid flowing in counter flow and the manipulation of the electric field across the ECM, various different thermodynamic cycles can be implemented.

Figure 6:
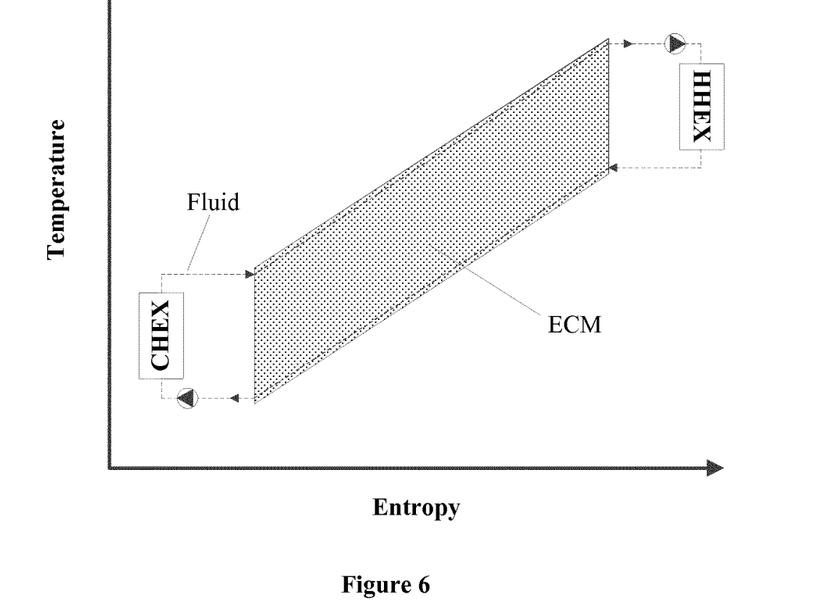
FIG. 6 visualizes a thermodynamic cycle according to the invention with two external heat exchangers.

FIG. 6 shows and example of the overall IRE Brayton cycle in a T-s diagram (without showing the small thermodynamic cycles at each electrocaloric unit). Additionally, the dashed lines represent the approximate temperature levels of the working fluid, as well as its connections to external heat exchangers (heat source and heat sink).

U.S. Pat. No. 4,757,688, US 2011/0113791 A1 and US 2010/0175392 A1 disclose electrocaloric devices using thermal diodes. However, these devices are designed as a cascade system, whereas the present invention applies internal regeneration with simultaneous electrocaloric effect of the electrocaloric material. The application of a thermal diode mechanisms acts therefore in a combination with the electrocaloric material in a different way. By using the inventive principle, the efficiency of the electrocaloric device may be improved for at least 20% and the compactness can be improved for at least 50%. The inventive concept utilizes thermal diodes as a fast heat transport device from or to the electrocaloric material.

Figure 7:
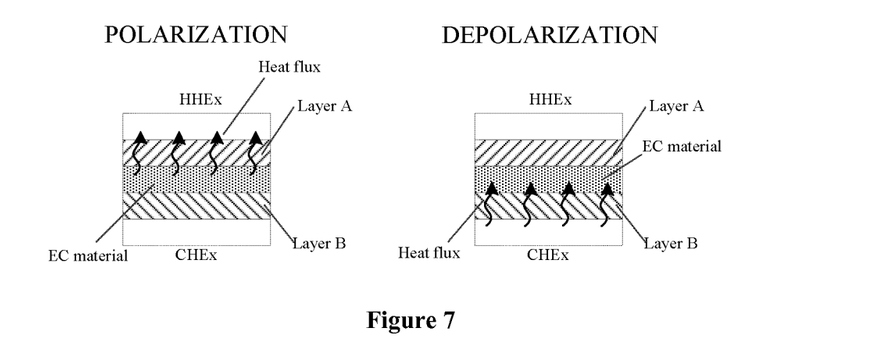
FIG. 7 visualizes selective heat transport using ECM and two thermal diodes.

FIG. 7 presents a basic concept of operation of thermal diodes in combination with the electrocaloric effect. On both sides of the electrocaloric material are fixed layers, denoted A and B. These two layers represent the thermal diodes. Upon polarization, Layer A (i.e., thermal diode A) rapidly transports heat from the electrocaloric material to the hot heat exchanger, while Layer B (Thermal diode B) does not transport heat and functions as a thermal insulator. Upon depolarization, Layer B (i.e., thermal diode B) rapidly transports heat from the cold heat exchanger to the electrocaloric material, while Layer A does not transport heat and functions as a thermal insulator.

In accordance with the invention, multiple cycles of the four operational steps shown in FIG. 2 are performed. After certain number of cycles a temperature profile is established in IRE structure with thermal diodes. However, temperature profile is established not only along, but also transversely to the IRE structure with thermal diodes.

Figure 8:
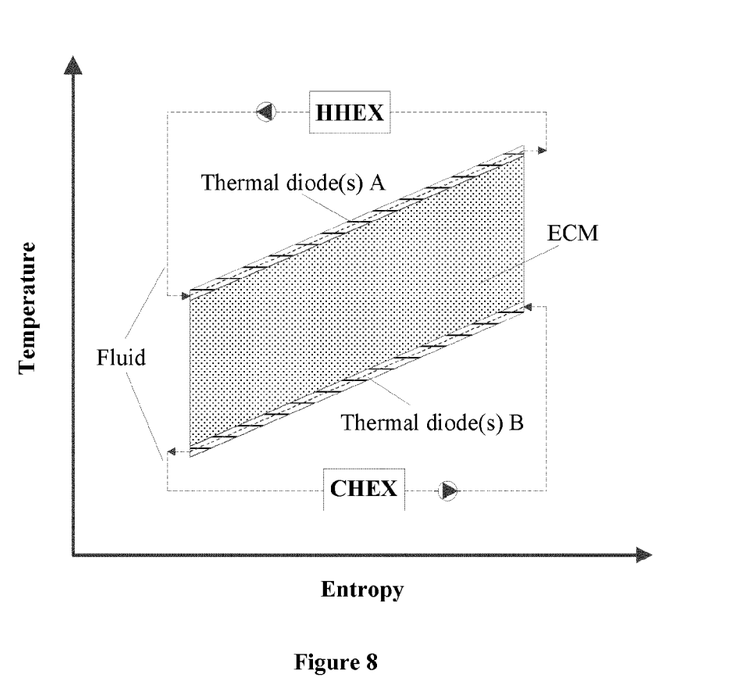
FIG. 8 visualizes a thermodynamic cycle of the invention applying thermal diodes and external heat exchangers, according to a first configuration.

FIG. 8 shows one example of the thermal diode embodiment, in which example two separate cycles of the working fluid are established. A hot cycle of working fluid and a cold cycle of working fluid exist separately. In accordance with the invention, the working fluid flows in counter flow.

Figure 9:
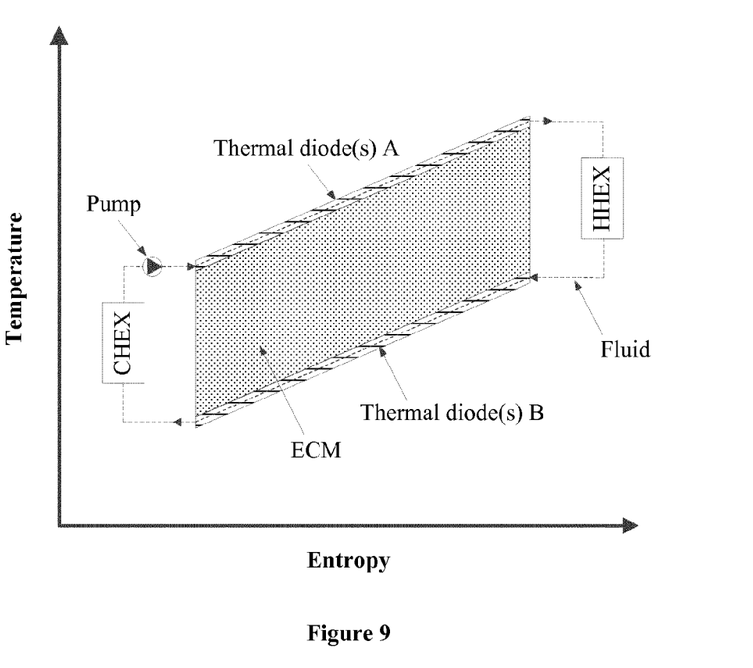
FIG. 9 visualizes a thermodynamic cycle of the invention applying thermal diodes and external heat exchangers, according to a second configuration.

FIG. 9 shows another example of the thermal diode embodiment. In this example, first and second streams of working are connected front-to-end, such that a single cycle of the working fluid is established. In accordance with the invention, the working fluid flows in counter flow.

The current invention represents a significant improvement of potential operational characteristics with regard to other existing theoretical design concepts for electrocaloric devices. The application of thermal diodes as a part of the electrocaloric refrigeration device increases the operating frequency and specific cooling power of the refrigeration device. Due to the increase in the operating frequency and thus a power density, this will lead to better compactness. In contrary to other existing concepts, in this patent, thermal diodes are applied in a nonconventional manner, where they provide a heat transport but not also a large temperature gradient between the hot and cold part of a thermal diode. By this, the irreversible losses are substantially lower when compared to examples of existing theoretical design concepts, in which thermal diodes are proposed to be applied in a cascade system.

A first group of embodiments of the invention using oscillatory convective counter flow in combination with an ECM structure having internal slots is now be explained with reference to FIGS. 10-12.

Figure 10:
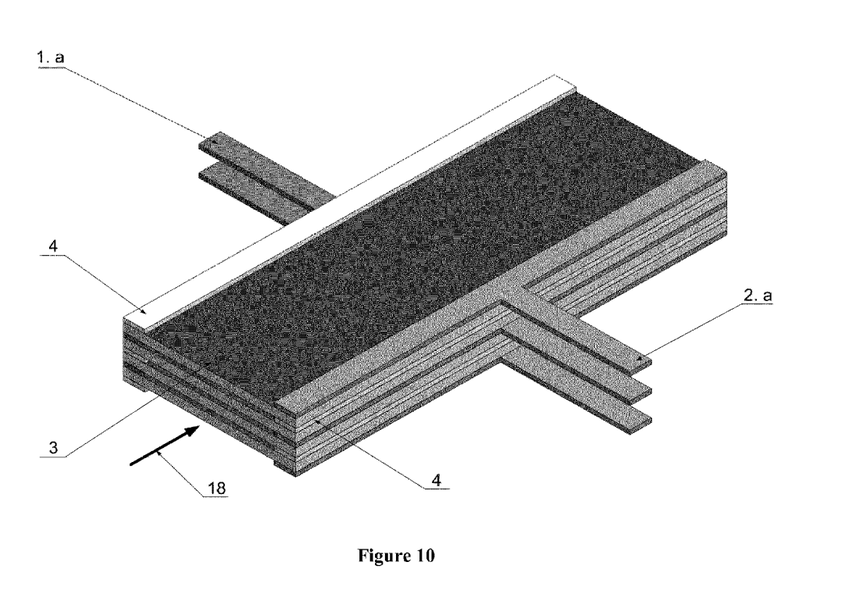
FIG. 10 shows a system according to the invention comprising multiple sets of the ceramic electrocaloric plates with electrodes and electric contacts.

FIG. 10 shows an assembly according to the invention comprising multiple sets of a bulk ceramic ECM with attached electrodes and electric contacts (1.a, 2.a—electrically conductive contacts connected to the voltage source, 3—ECM (plates) with overlying electrodes, 4—non-conductive spacers, 18—current direction of fluid flow).

Figure 11:
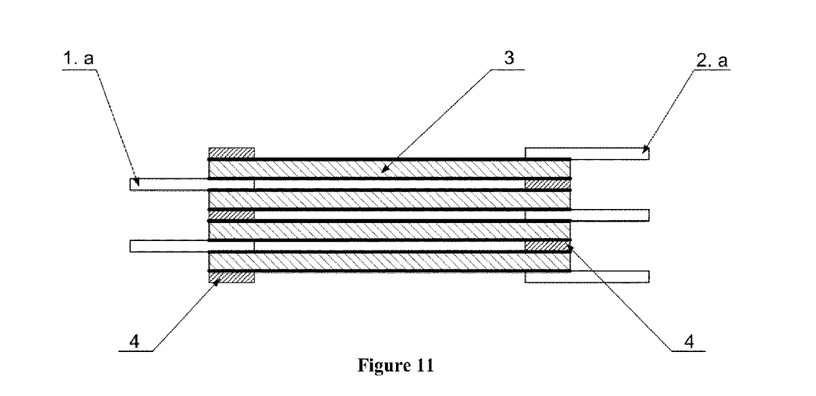
FIG. 11 provides a side view of the system shown in FIG. 10.

FIG. 11 provides a side view of the assembly shown in FIG. 10. The electrical contacts on the left side are connected to a negative potential and the electrical contacts on the right side are connected to a positive potential of the voltage source (and vice versa).

Figure 12:
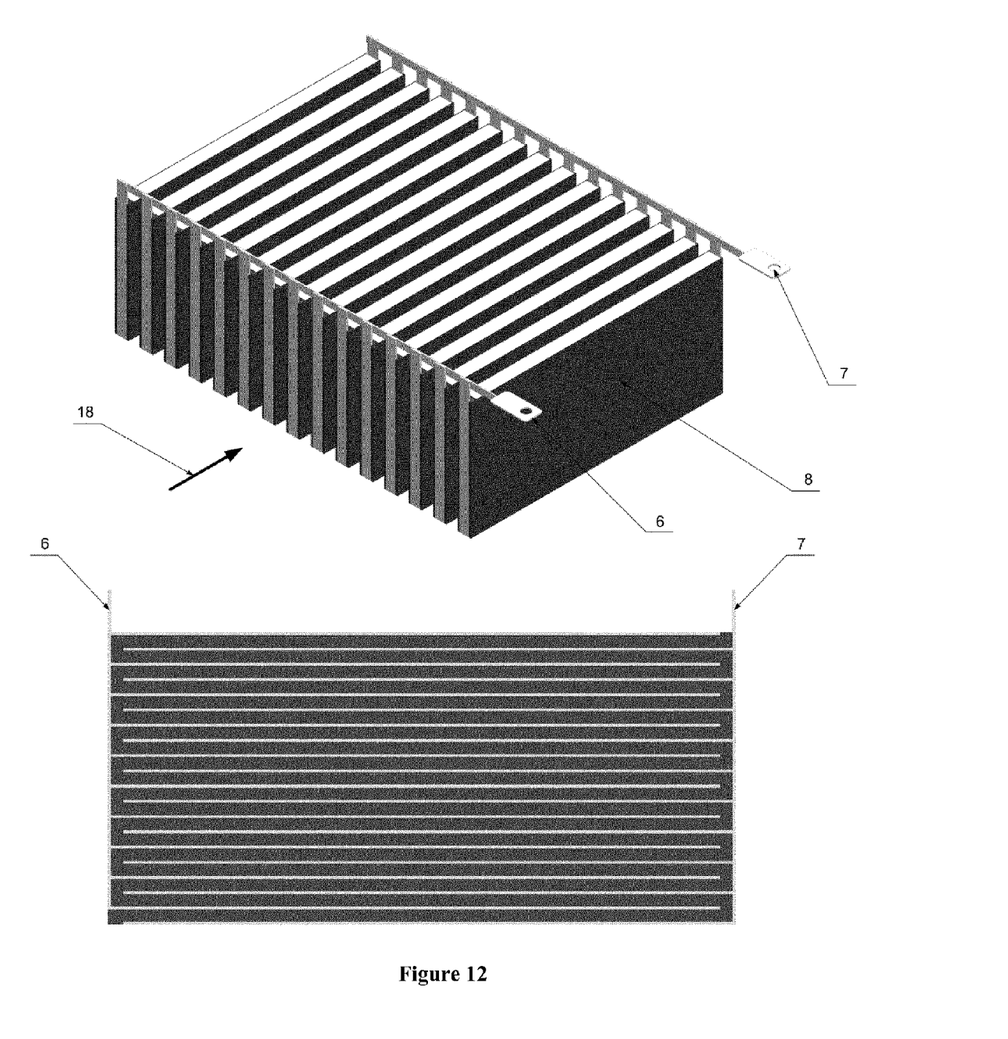
FIG. 12 shows another variant of the ECM plate assembly.

FIG. 12 shows an arrangement with multilayer electrocaloric material (6, 7—connectors for connecting electrodes of the segments with electrocaloric material to the voltage source, 8—segments of multilayer electrocaloric material).

A second group of embodiments of the invention using ECM in combination with thermal diodes shall now be explained with reference to FIGS. 13 and 14.

Figure 13:
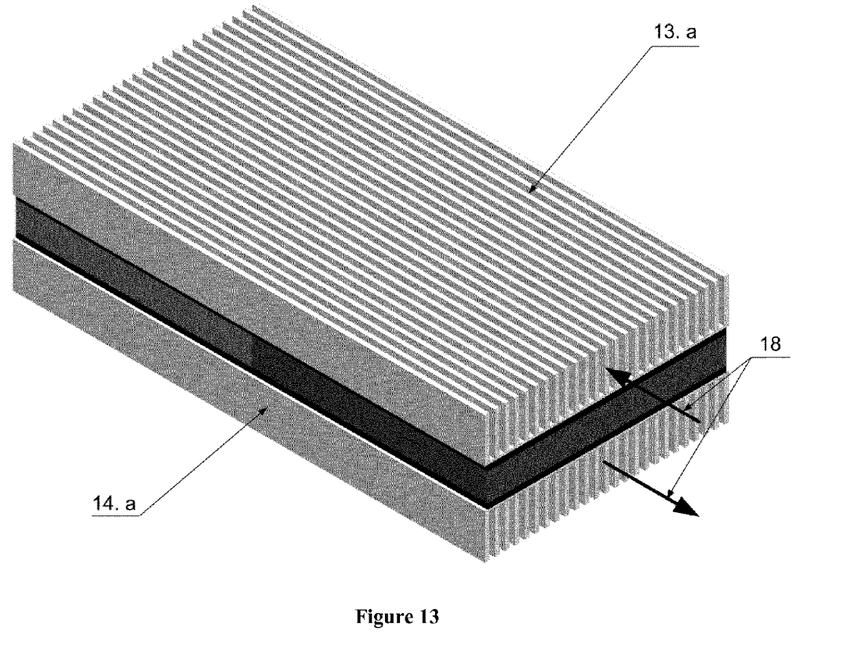
FIG. 13 shows an embodiment of the invention based on a working fluid flowing in counter flow in combination with thermal diodes.

FIG. 13 shows an arrangement including thermal diodes and an extended heat exchanger surface (13a, 14a—extended surface of the heat exchanger).

Figure 14:
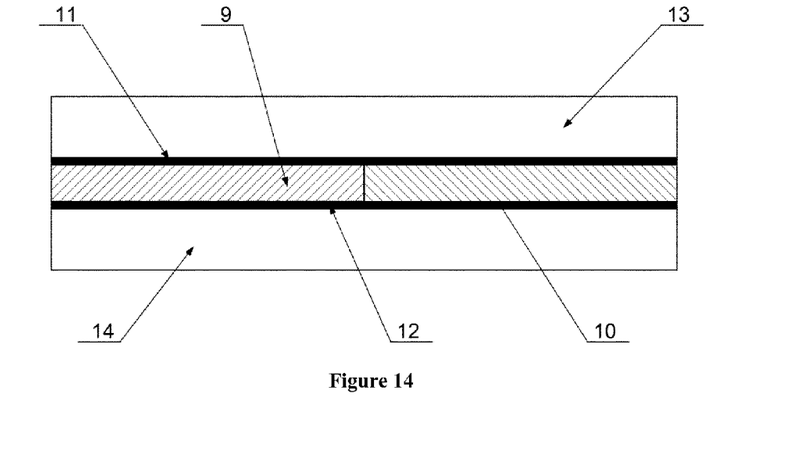
FIG. 14 shows a magnified view of the embodiment based on working fluid in counter flow and thermal diodes.

FIG. 14 is a cross sectional view of an IRE structure with thermal diodes (9—electrocaloric material; 11, 12—thermal diodes; 13, 14—extended surface for heat transport).

The present invention shall now be defined by the terms of the following claims.

The invention claimed is:

1. A system for electrocaloric energy conversion, said system comprising
   a heat sink;
   a heat source;
   a first convective stream of working fluid flowing towards said heat sink;
   a second convective stream of said fluid flowing towards said heat source; and
   an electrocaloric material (ECM); wherein
   means are provided for alternately exposing said ECM to increasing and decreasing electrical fields, wherein, when said ECM is exposed to an increasing electrical field, the temperature of said ECM is increased, and wherein, when said ECM is exposed to a decreasing electrical field, the temperature of said ECM is reduced; said system further comprising
   means for allowing selective transport of heat from said ECM to said first convective stream, when the ECM is at a higher temperature than the temperature of said first convective stream, thereby increasing the temperature of said first convective stream; and
   means for allowing selective transport of heat from said second convective stream to said ECM, when said ECM is at a lower temperature than the temperature of said second convective stream, thereby decreasing the temperature of said second convective stream;
   such that said first and second convective streams of said working fluid, upon operation, result in a net flow of heat energy from said heat source to said heat sink, wherein
   said first and second convective streams of working fluid are in separate conduits, and
   said means for allowing transport of heat from the ECM to said first convective stream and said means for allowing transport of heat from the second convective stream to said ECM both comprise a thermal diode or a thermal switch.

2. The system of claim 1, wherein said first and said second convective streams are each thermally coupled to said ECM via said thermal diode or a thermal switch.

3. The system of claim 1, wherein said ECM is selected from the group consisting of: electrocaloric polymers, electrocaloric single crystals, and electrocaloric ceramics.

4. The system of claim 1, wherein the working fluid is selected from the group consisting of liquid working fluid, water, aqueous solutions, liquid metal, alcohols, saline, oil and refrigerants.

5. The system of claim 1, wherein said heat source is at a temperature level lower than the temperature level of said heat sink.

6. The system of claim 1, wherein said means for allowing transport of heat from said second convective stream to said ECM, and from said ECM to said first convective stream allows transport of heat at multiple stages along said ECM, such that a temperature gradient in said first and second convective flow is established.

7. The system of claim 6, wherein the number of stages is defined according to the required temperature gradient.

8. The system of claim 1, wherein said first and second convective streams are connected front to end, to allow circular flow of the working fluid between heat source and heat sink.

9. A method of electrocaloric energy conversion, said method comprising the steps of:
   providing a heat;
   providing a heat source;
   providing a first convective stream of working fluid flowing towards said heat sink;
   providing a second convective stream of said working fluid flowing towards said heat source;
   providing an ECM; and
   alternately exposing said ECM to an increasing and a decreasing electrical field, wherein, when said ECM is exposed to said increasing electrical field, the temperature of said ECM is increased, and, when said ECM is exposed to said decreasing electrical field, the temperature of said ECM is decreased; and
   allowing for the selective transport of heat from said ECM to said first convective stream, when said ECM is at a higher temperature level than is said first convective stream, thereby increasing the temperature of said first convective stream of working fluid; and
   allowing for the selective transport of heat from said second convective stream of working fluid to the ECM, when said ECM is at a lower temperature level than is said second convective stream of working fluid, thereby decreasing the temperature of said second convective stream of working fluid;
   thereby producing a net flow of heat from said heat source to said heat sink by said first and second convective streams of working fluid, wherein
   said first and second convective streams of working fluid are provided in separate conduits, and
   the transport of heat from said ECM to said first convective stream, and said transport of heat from said second stream of working fluid to said ECM are respectively effected through a thermal diode or through a thermal switch.

10. Method of claim 9, wherein said transport of heat from said second convective stream to said ECM, and from said ECM towards said first convective stream occurs at multiple stages along said ECM.

11. Method of claim 10, wherein a temperature gradient in said first and in said second convective flow is established.

12. Method of claim 9, wherein the working fluid is selected from the group consisting of liquid working fluid, water, aqueous solutions, liquid metal, alcohols, saline, oil or refrigerants.

* * * * *